April 24, 1951   G. K. ADAMS   2,549,760
AERODYNAMIC FLAP BALANCE AND AUXILIARY AIRFOIL
Filed April 14, 1949
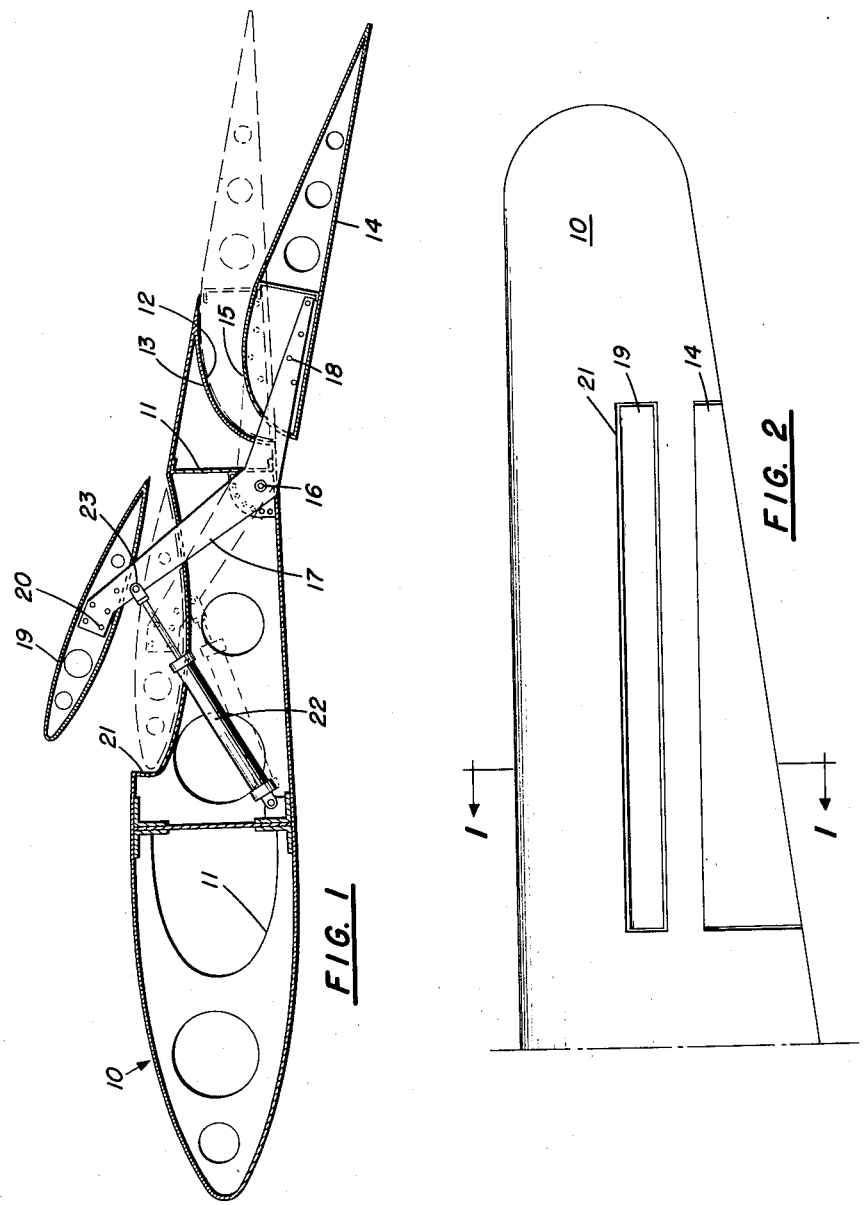
Inventor
GEORGE K. ADAMS
By
Attorney Patented Apr. 24, 1951

2,549,760

UNITED STATES PATENT OFFICE 2,549,760

AERODYNAMIC FLAP BALANCE AND AUXILIARY AIRFOIL

George Kenneth Adams, Norfolk, Va.

Application April 14, 1949, Serial No. 87,498

3 Claims. (Cl. 244—42)

(Granted under the act of March 3, 1883, as amended April 30, 1928; 370 O. G. 757)

This invention relates generally to aircraft wing structure and specifically to an aircraft wing having more than one landing flap of improved characteristics.

Landing flaps at present are used to increase the lifting force of a wing and are usually incorporated in the wing structure at the trailing edge thereof, and by levers or hydraulic means are lowered or deflected downwardly to increase lift and reduce air speed. Various forms of flaps have been used, many of them requiring excessive forces to move into operative position due to the changes in the airflow over the top and bottom of the flap.

An object of this invention is to provide a landing flap in which the forces necessary to operate it are reduced to a minimum.

Another object of the invention is to provide a landing flap which is substantially balanced, aerodynamically speaking, in the airflow over the wing.

Another object is to provide a landing flap having a single hinge line and in which a portion of the flap is positioned in the air stream over the wing and is operative to deflect air over the rear portion of the wing to decrease turbulence and to prevent stalling of the aircraft.

A further object of the invention is to provide a flap hinged to the fixed wing in such a position as to deflect a substantial portion of the airstream from the underside of the wing to the upper side of rear portion of the flap. A further object is to provide an additional flap operating from the upper surface of the wing to increase the total flap area and thereby increasing the lift of the wing above that obtained by a single flap. A still further object is to provide a flap that has in its operative position a positive angle of incidence and thereby increasing lift.

Other objects and advantages of the invention will hereinafter become more fully apparent from the following description of the annexed drawings, which illustrate a preferred embodiment, and wherein:

Fig. 1 shows a view in cross section of the invention in operative position with the inoperative position indicated in dotted lines.

Fig. 2 shows a top view in elevation of the invention.

Referring more particularly to the drawing, in Fig. 1 a fixed wing 10 is shown in cross section having internal struts 11 of conventional design. At the trailing edge of the wing an arcuate portion 12 is formed and suitably covered on the inner surface by wing covering 13 of conventional material. The rear portion or rear flap 14 has an arcuate forward face 15 matching the arcuate portion 12 of the fixed wing, and is pivoted on a hinge line 16 at or near the lower surface of the fixed wing in advance of the arcuate portion by means of two or more forwardly extending brackets 17 which are secured to the rear flap 14 by means such as bolts 18 and at their forward ends are similarly secured by bolts 20 to front flap 19, which is normally in a recess 21 provided in the upper surface of wing 10.

Hydraulic operating gear 22 is secured at one end to the fixed wing 10 and by pivot 23 to one or more of the brackets 17 at such a point thereon as to provide suitable leverage. Hydraulic lines, valves and source of power to operate the operating gear 22 are of conventional design and are not here illustrated as they are not a part of the invention.

In Fig. 2 one embodiment of the invention shows the wing 10 with front portion 19 of the flap extending along a portion of the wing 10, and the rear portion 14 of the flap from the trailing edge of the wing 10 and of the same length, although it is not necessary that the front and rear portions be of identical length, as in some cases it may be found advantageous to vary the effective lengths of either by reason of spoiler effects of the wing root etc.

As will be readily seen from the foregoing description, the operation of the device is in the conventional manner for landing flaps, and as the rear portion of the flap is deflected downward, the front portion leaves the recess and in its operative position deflects a portion of the air stream downwardly over the upper surface of the wing. It will also be seen that a portion of the air stream beneath the fixed wing is deflected over the upper surface of the rear portion of the flap, thus providing an optimum condition of drag and lift on that surface.

It should be understood, of course, that the foregoing description relates to only one preferred embodiment of the invention and that numerous obvious modifications or alterations may be made therein without departing from the spirit and the scope of the invention as set forth in the appended claims.

The invention described herein may be manufactured and used by or for the Government of the United States of America for governmental purposes without the payment of any royalties thereon or therefor.

What is claimed is:

1. In aircraft, a wing having a relatively fixed portion, a recess in the upper surface of said fixed portion, a recess in the lower surface of said fixed portion at the trailing edge thereof, and a flap comprising an arm pivoted near its center to said fixed portion, a pair of airfoil members of equal span-wise length secured one at each end of said arm, the forward one of said pair of airfoil members constructed and arranged to fit in inoperative position into said recess in the upper surface, the rear one of said pair of airfoil members in inoperative position forming a trailing edge to said fixed portion and fitting into said recess in the lower surface thereon, and means in said wing for simultaneously moving said airfoil members between operative and inoperative positions.

2. In aircraft, a wing having a fixed portion, a recess in the upper surface of said fixed portion, an arcuate trailing edge on said fixed portion, a rear flap having an arcuate forward edge matching said trailing edge in configuration and positioned adjacent thereto, an arm pivotally secured to said fixed portion near the lower surface thereof and fixedly connected to said rear flap, a front flap of airfoil shape of the same span-wise length as said rear flap constructed and arranged to fit into said recess and fixed to said arm forward of its pivotal connection to said fixed portion, and means in said fixed portion connected to said arm for moving both flaps simultaneously between operative and inoperative positions.

3. In an aircraft having a relatively fixed wing, a flap comprising an arm pivoted near its center to the wing, a pair of airfoil members of equal span-wise length one of which is secured to each end of said arm, the forward one of said pair of airfoil members constructed and arranged to make up the contour of said wing in inoperative position, the rear one of said pair of airfoil members in inoperative position constructed and arranged to form the trailing edge of said wing, and means in said wing operable to move said arm and thereby said pair of airfoil members between operative and inoperative positions whereby additional lift is provided to said wing.

GEORGE KENNETH ADAMS.

REFERENCES CITED

The following references are of record in the file of this patent:

UNITED STATES PATENTS

| Number | Name | Date |
| --- | --- | --- |
| 1,501,523 | Clark | July 15, 1924 |
| 1,992,158 | Hall | Feb. 19, 1935 |
| 2,018,546 | Clark | Oct. 22, 1935 |
| 2,263,992 | Joyce | Nov. 25, 1941 |
| 2,282,647 | Dillon | May 12, 1942 |
| 2,329,177 | Baker | Sept. 14, 1943 |